US008706676B2

(12) United States Patent
Claxton et al.

(10) Patent No.: US 8,706,676 B2
(45) Date of Patent: Apr. 22, 2014

(54) ESTIMATING A STATE OF AT LEAST ONE TARGET USING A PLURALITY OF SENSORS (75) Inventors: Christopher David Claxton, Bristol (GB); David Nicholson, Bristol (GB); Steven Reece, Oxford (GB); Stephen John Roberts, Oxford (GB)

(73) Assignee: BAE Systems PLC, London (GB)

( * ) Notice: Subject to any disclaimer, the term of this patent is extended or adjusted under 35 U.S.C. 154(b) by 291 days.

(21) Appl. No.: 13/378,323

(22) PCT Filed: Jun. 22, 2010

(86) PCT No.: PCT/GB2010/051029
§ 371 (c)(1),
(2), (4) Date: Dec. 14, 2011

(87) PCT Pub. No.: WO2011/001162
PCT Pub. Date: Jan. 6, 2011

(65) Prior Publication Data
US 2012/0089554 A1 Apr. 12, 2012

(30) Foreign Application Priority Data

Jun. 29, 2009 (EP) ................................ 09275049
Jun. 29, 2009 (GB) ................................ 0911165.9

(51) Int. Cl.
*G06N 5/02* (2006.01)
(52) U.S. Cl.
USPC .......................................................... 706/52
(58) Field of Classification Search
USPC .......................................................... 706/45
See application file for complete search history.

(56) References Cited

U.S. PATENT DOCUMENTS

| 5,005,147 | A | 4/1991 | Krishen et al. |
| 2001/0037163 | A1 | 11/2001 | Allard |
| 2003/0216834 | A1 | 11/2003 | Allard |
| 2004/0243344 | A1 | 12/2004 | Kronhamn et al. |
| 2006/0082490 | A1 | 4/2006 | Chen et al. |
| 2006/0224357 | A1 | 10/2006 | Taware et al. |
| 2007/0198222 | A1 | 8/2007 | Schuster et al. |
| 2008/0027591 | A1 | 1/2008 | Lenser et al. |

FOREIGN PATENT DOCUMENTS

| EP | 2 071 295 A2 | 6/2009 |
| WO | WO 2008/135978 A | 11/2008 |

OTHER PUBLICATIONS

Chow et al., "Bayesian Design of Decision Rules for Failure Detection" IEEE Transactions on Aerospace and Electronic Systems, (1984), vol. AES-20, No. 6, pp. 761-774.

(Continued)

*Primary Examiner* — Jeffrey A Gaffin
*Assistant Examiner* — Ola Olude Afolabi
(74) *Attorney, Agent, or Firm* — Buchanan Ingersoll & Rooney PC (57) ABSTRACT The method includes receiving a plurality of target observations from a respective plurality of sensors and using the target observations to compute target state estimates. Each of the target state estimates is assessed to check if it suffers from one of a set of modelled possible fault types. The target state estimates are adjusted to compensate for any modelled fault type when it is assessed to be suffering from that fault type. A reliability value is computed for each of the target state estimates and the target state estimates are fused together based on the computed reliability values to produce a fused target state estimate.

13 Claims, 11 Drawing Sheets (56) References Cited

OTHER PUBLICATIONS

Salmond, "Mixture Reduction Algorithms for Target Tracking in Clutter" Signal and Data Processing of Small Targets, SPIE 1305, OE Drummond, Ed, (1990), pp. 1-4.
International Search Report (PCT/ISA/210) issued on Oct. 7, 2010, by European Patent Office as the International Searching Authority for International Application No. PCT/GB/2010/051029.
European Search Report for EP 09275007.4 dated Jun. 19, 2009.
United Kingdom Search Report for GB 0911165.9 dated Oct. 27, 2009.
R. Pigliacampo, "Multi-Tracking of Moving Objects with Unreliable Sensors for Mobile Robotic Platforms", 12 pages, retrieved from internet: http://www.dis.uniroma1.it/{iocchi/ARGOS/docs/NNMHTracking.pdf.
S. Bapat et al., "Reliable Estimation of Influence Fields for Classification and Tracking in Unreliable Sensor Networks", 24th IEEE Symposium on Reliable Distributed Systems, Oct. 26, 2005, 10 pages.
T. Fong et al., "Novel Interfaces for Remote Driving: Gesture, Haptic and PDA", Mobile Robots XV and Telemanipulator and Telepresence Technologies VII, 2001 (month unknown), pp. 300-311, vol. 4195.
M. Montemerlo et al., "Carmen. Robot Navigation toolkit", 23 pages, retrieved from the internet: http://web.archive.org/web/20080206184107/http://carmen.sourceforge.net.
U. Kartoun, "Tele-Control of a Mobile Robot Using Touch Screen Interface", 6 pages, retrieved from the internet: http://www.youtube.com/watch?v=4sxHRVvHo1l.
Notification Concerning Transmittal of International Preliminary Report on Patentability (Forms PCT/IB/326 and PCT/IB/373) and the Written Opinion of the International Searching Authority (Form PCT/ISA/237) issued on Jan. 12, 2012, in the corresponding International Application No. PCT/GB2010/051029.

ESTIMATING A STATE OF AT LEAST ONE TARGET USING A PLURALITY OF SENSORS

BACKGROUND TO THE INVENTION

The present invention relates to estimating a state of at least one target using a plurality of sensors.

The deployment of sensor networks to monitor and track events, objects and situations in a variety of environments is becoming widespread. Uncertainty due to random noise is endemic in sensor measurements, but it is known to attempt to reduce its effect using filtering processes. Sensors can generate faulty measurements for a number of reasons, such as power failure, physical damage, and mis-calibration. If parameterised models for the fault types are available, they can be exploited by a fault recognition algorithm; however, often an explicit fault model is not known, in which case the algorithm must be able to deal with model incompleteness.

It is possible to decentralise the filtering processes in order to try to reduce the computational and communication bottlenecks; however, this can exacerbate the problem of a faulty sensor because its measurement may be fused at multiple sites and then the fused data is re-propagated to further fusion nodes so the impact of a fault can spread through the network. This means that there is a particularly strong imperative to deal with faulty sensor data in a networked sensor fusion system.

SUMMARY OF THE INVENTION

Embodiments of the present invention are intended to filter and fuse uncertain sensor data to try to ensure that it produces statistically consistent state estimates.

According to a first aspect of the present invention there is provided a method of estimating a state of at least one target using a plurality of sensors, the method including:

(1) receiving a plurality of target observations from a respective plurality of sensors;

(2) using the target observations to compute target state estimates;

(3) assessing whether each of the target state estimates suffers from one of a set of modelled possible fault types;

(4) adjusting the target state estimates to compensate for a said modelled fault type if that target state estimate is assessed to suffer from that modelled fault type;

(5) computing a reliability value for each of the target state estimates;

(6) fusing the target state estimates based on the computed reliability values to produce a fused target state estimate.

The steps (1), (2) and/or (3) can involve a multi-hypothesis dual Kalman filter process. The method may further include estimating a time period during which each of the target state estimates suffered from the at least one modelled possible fault type.

The method may include calculating a failure hypothesis associated with each of the target state estimates, the failure hypothesis includes a state covariance matrix; predictions for the target state estimate that exclude at least some of the observations; a probability value associated with the target state estimate suffering from the at least one modelled fault type.

The step of computing a reliability value for each of the target state estimates may be performed for the observation received from each sensor individually. The step of computing the reliability of the target state estimates can include computing a distance between the target state estimate as computed using the observation from a first one of the sensors and a target state estimate as computed using the observation(s) from at least one other of the sensors. A said target state estimate can be computed as being unreliable if the distance exceeds a predefined threshold value. The step of fusing the target state estimates can include fusing the target state estimates only if the target state estimates are computed as being reliable. The fusion step can include Kalman filter (or even covariance intersection) and mixture reduction processes.

According to another aspect of the present invention there is provided a computer program product comprising a computer readable medium, having thereon computer program code means, when the program code is loaded, to make the computer execute method of a estimating a state of at least one target using a plurality of sensors substantially as described herein.

According to yet another aspect of the present invention there is provided a system configured to estimate a state of at least one target using a plurality of sensors, the system including:

a plurality of sensors configured to receive target observations;

a device configured to receive a plurality of target observations from the plurality of sensors;

a device configured to use the target observations to compute target state estimates;

a device configured to assess whether each of the target state estimates suffers from one of a set of modelled possible fault types;

a device configured to adjust the target state estimates to compensate for a said modelled fault type if that target state estimate is assessed to suffer from that modelled fault type;

a device configured to compute a reliability value for each of the target state estimates;

a device configured to fuse the target state estimates based on the computed reliability values to produce a fused target state estimate.

The sensors may be configured to transfer their observations to a remote device that includes: the device configured to use the target observations to compute target state estimates; the device configured to assess whether each of the target state estimates suffers from at least one modelled possible fault type, and the device configured to adjust the target state estimates to compensate for a said modelled fault type if that target state estimate is assessed to suffer from that modelled fault type.

Each of the sensors may include the device configured to use the target observations to compute target state estimates; the device configured to assess whether each of the target state estimates suffers from at least one modelled possible fault type, and the device configured to adjust the target state estimates to compensate for a said modelled fault type if that target state estimate is assessed to suffer from that modelled fault type.

Embodiments of the system described herein typically incorporate two data processing stages. The first stage attempts fault recognition and removal by hypothesising a number of models to describe the faults. This enables the fault to be removed from the data. For each model a recursive estimator can be applied to the data and a Bayesian approach may then be used to learn the probability that the model is correct, as well as the probability density function over the model parameters. The state estimates can be processed by a mixture reduction algorithm to provide a single summary estimate encompassing all fault types from each source.

The second stage normally applies a further data fusion algorithm to combine state estimates from multiple sources.

Robustness is usually required because the estimates may not be entirely reliable, due to un-modelled or imprecisely modelled fault types. A learning stage can determine the reliability of each estimate and a fusion algorithm combines them. The second stage algorithm may be replicated on all fusion nodes within a decentralised sensor system.

In some embodiments, if it is known what the fault is (i.e. the known known), it can be removed at the first stage of the algorithm. Alternatively, if a closed set of fault types is assumed but it isn't known which one is operating at a given time (i.e. known unknowns) then it is possible to place a distribution over the faults in the first stage of the algorithm. In this case, the distribution is known but the fault is unknown. Finally, if the world under consideration is not closed and there are faults which haven't been modelled (i.e. the unknown unknowns) then the second stage can utilise a Bayesian voting scheme to remove unreliable sensors.

The embodiments may deal with three main types of uncertainty: uncertainty associates with noisy sensor measurements; systematic uncertainty, associated with faulty sensor measurements where the fault parameters are known, and epistemic uncertainty, associated with faulty sensor measurements where the fault parameters are not completely known.

Whilst the invention has been described above, it extends to any inventive combination of features set out above or in the following description. Although illustrative embodiments of the invention are described in detail herein with reference to the accompanying drawings, it is to be understood that the invention is not limited to these precise embodiments. As such, many modifications and variations will be apparent to practitioners skilled in the art. Furthermore, it is contemplated that a particular feature described either individually or as part of an embodiment can be combined with other individually described features, or parts of other embodiments, even if the other features and embodiments make no mention of the particular feature. Thus, the invention extends to such specific combinations not already described.

DESCRIPTION OF THE PREFERRED EMBODIMENT

The invention may be performed in various ways, and, by way of example only, embodiments thereof will now be described, reference being made to the accompanying drawings in which.

Figure 1:
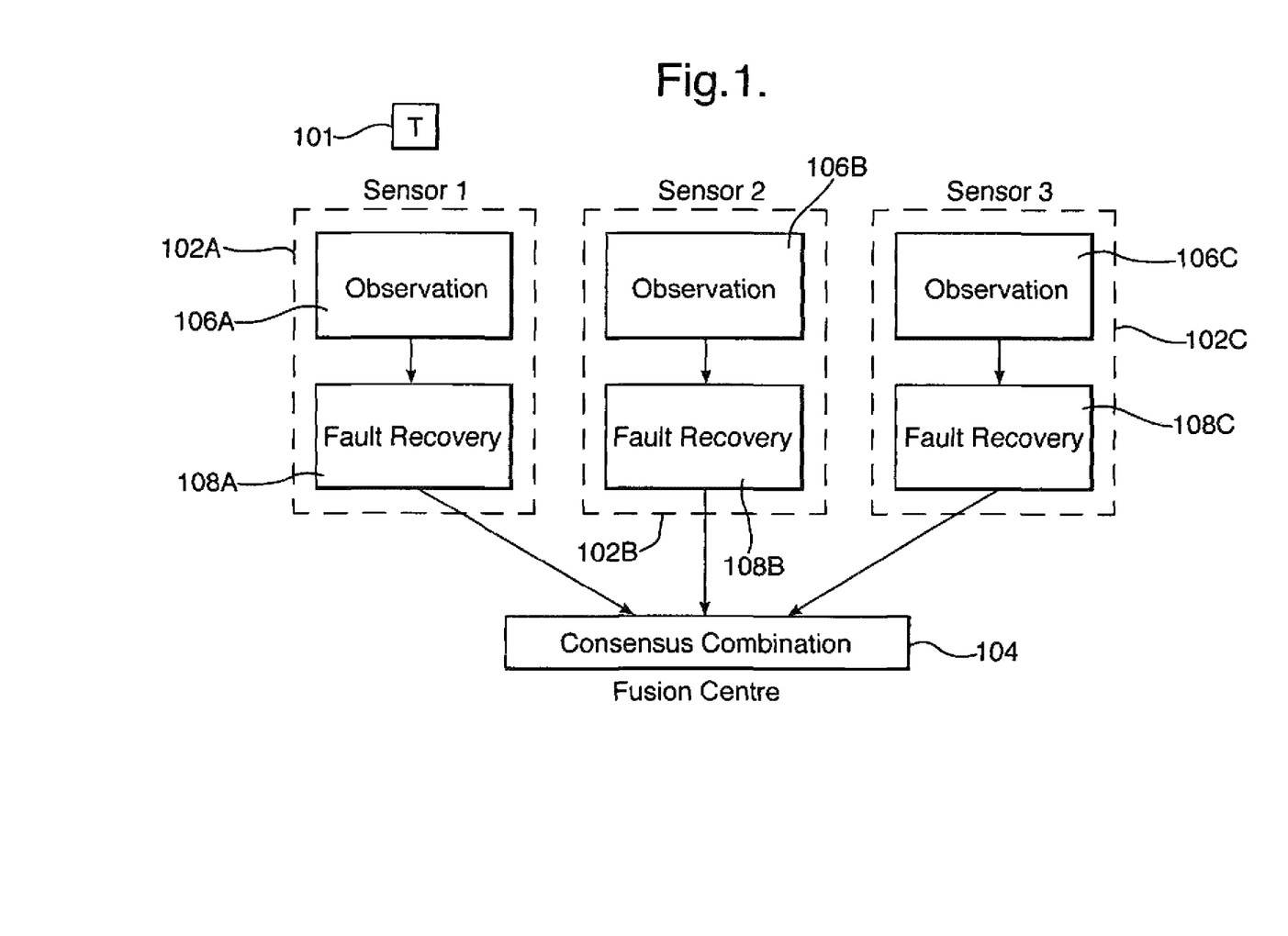
FIG. 1 is a schematic drawing of an example sensor system.

FIG. 1 illustrates an example system architecture where three sensors 102A-102C are configured to observe a target 101. The sensors are in communication with a fusion centre 104. Various types of sensors may be used, e.g. RADAR, LIDAR, or image-based. It will be appreciated that the number and arrangement of sensors in the Figure are exemplary only and many variations are possible. Further, the system can be modified to track more than one target substantially simultaneously.

Each sensor takes an observation/measurement 106A-106C and passes it to an onboard processor 108A-108C that is configured to execute a fault recovery process. An aim of the system is to estimate the location, x, of the target using potentially faulty sensor readings from the network of sensors. Each sensor tracks the target over time and attempts to remove any faults from its observations before fusing them with its estimate of the target's location. This is referred to as the first stage of the example algorithm. A second stage of the example algorithm involves fusing together the fault-rectified estimates supplied by each sensor. This second stage accommodates inadequacies in each sensor's fault recovery process when the sensor's estimate still encodes some residual fault. This stage de-emphasises sensor estimates for which the faults have not been successfully removed.

Two general decentralised system architectures are possible, each architecture differing in the way it performs a first stage of the fault recovery algorithm. In the example architecture of FIG. 1 this stage is performed at each sensor node before communicating the results to the fusion centre 104. The architecture of FIG. 1 is communication intensive, but places a relatively small computational burden on the fusion centre. In an alternative architecture, the sensors communicate their raw observations to the fusion centre, with the requirement that the fusion centre performs the first stage on each sensor input stream. This alternative architecture is not so communication intensive but requires more computation at the fusion centre. The two-stage fault recovery algorithm can be applied to both approaches.

Most previous approaches to fault recognition assume the fault modes can be perfectly described by a parameterised model. In practice, there is likely to be some deviation between what the actual faults look like and what the models predict. This residual may or may not be important given the sensor system and its application. However, in a decentralised network even small residuals can have a significant impact as they propagate through the fusion network. Embodiments of the system described herein contains the required level of robustness to ensure that residual errors in fault recognition/removal do not prevent statistically consistent estimates from being formed at the sensor fusion nodes.

Embodiments of the system can use both model-based and voting-based approaches to perform fault identification, isolation and fault removal and may present the user with a consistent estimate of the location of a target. By casting this type of solution in a Bayesian framework, it is possible to use the soft decision making properties of Bayes to formulate a hybrid model-based/voting approach for target tracking in the presence of modelled and un-modelled faults. It is possible to cast a solution in terms of individual sensor nodes. As a result, the approach described herein is computationally efficient and also decentralisable.

A general outline of the problem solved by the embodiments is to track a process x over time t where:

$$x(t)=G(t)x(t-1)+w_p$$

G(t) is the linear, time dependent plant model and $w_t$ is zero-mean, Gaussian distributed with covariance $Q_t$. The process is observed by a set S of potentially faulty sensors. For each s∈S:

$$z_s(t)=x(t)+e_s(t)+v_{s,t}$$

where $v_{s,t}$ is zero-mean, Gaussian distributed with covariance $W_{s,t}$. We assume uncorrelated noise throughout, $E[w_{t_1}, w_{t_2}]=0$ and $E[v_{s_1,t_1}, v_{s_2,t_2}]=0$ for $s_1 \neq s_2$ or $t_1 \neq t_2$ and, also, $E[w_{t_1}, v_{s_2,t_2}]=0$ for all $t_1$, $t_2$ and $s_2$.

Figure 2:
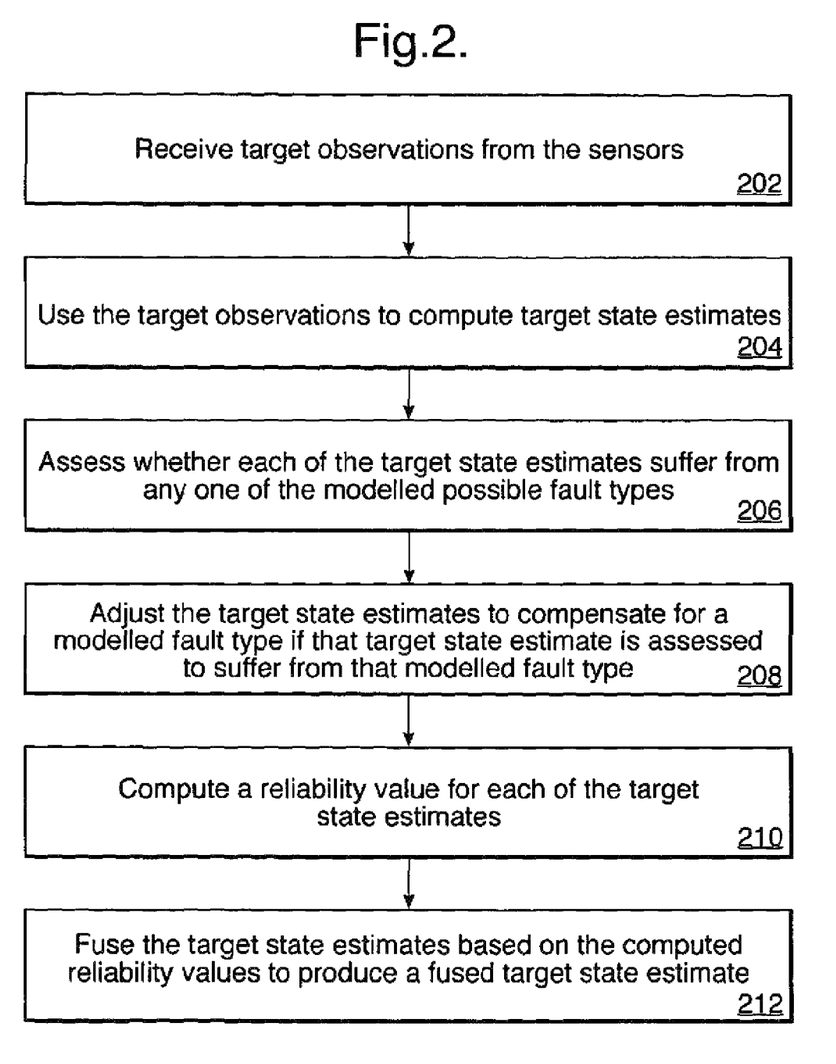
FIG. 2 is a flowchart showing steps performed by the system.

FIG. 2 is a flow chart illustrating the general steps performed by an embodiment of the sensor system. At step 202 the observations from the sensors 102 are received for processing. At step 204 estimates for the target states are computed using the observations. At step 206 each of the target states is assessed to check whether it suffers from one of a set of modelled possible fault types, such as the types described below with reference to FIG. 3. If a target estimate is found likely to be suffering from one of the modelled fault types then at step 208 that state estimate is adjusted to compensate for that particular fault type. This can be done using the multi-hypothesis dual Kalman filter approach described herein, for example. In the example system shown in FIG. 1, steps 204, 206 and 208 can be considered to correspond to the first stage of the algorithm and may be performed by the processors 108 onboard the sensors 102.

At step 210 a reliability value for each of the target states is computed, e.g. using the techniques detailed below, and at step 212 the observations are fused together, taking into consideration the reliability values calculated in the previous step, in order to produce a fused target state estimate. In the example system shown in FIG. 1, steps 210 and 212 can be considered to correspond to the second stage of the algorithm and may be performed by a processor onboard the fusion centre 104.

The error process e(t) is a function of the fault type (ft). In the present example we consider drift, spike, shock and echo fault types. These four fault types will now be described with reference to FIG. 3, although the skilled person will appreciate that the approach is not limited to these fault types alone.

Figure 3:
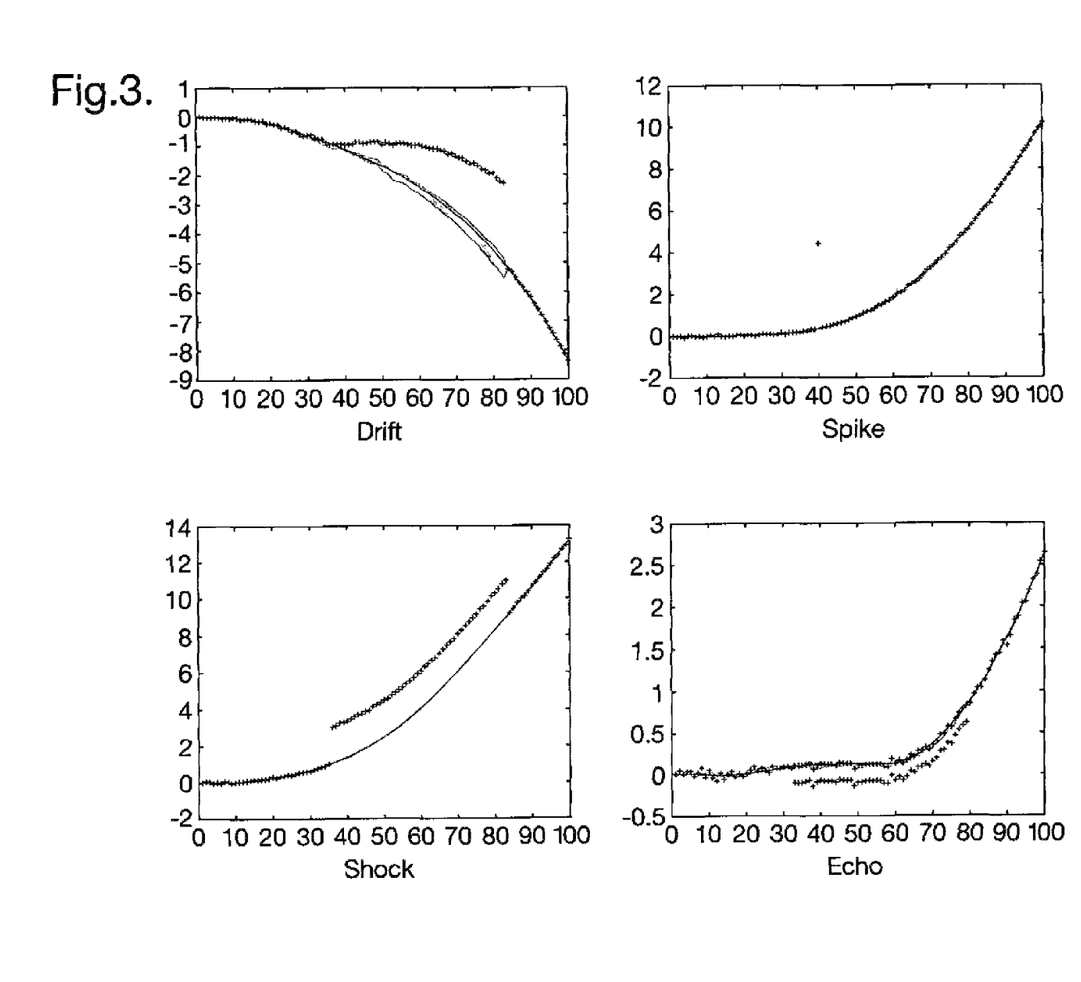
FIG. 3 includes graphs illustrating of faults dealt with by the system.

FIG. 3 graphically illustrates the types of fault that can be recognised by embodiments of the invention. The true target trajectory in each graph is shown in solid line and the crosses show the (sometimes faulty) target observations. Also shown are target trajectory estimates obtained using the described below with the faulty observations.

The fault types dealt with by the example system include:
1. Drift: The error gradually increases linearly from zero over time until there is an abrupt cut-off at which the sensor bias disappears.

$$e(t) = \begin{cases} \Delta & \text{if } fst \leq t \leq fet \\ 0 & \text{otherwise} \end{cases}$$

The parameter $\Delta$ is the drift rate.

2. Spike: A single observation is offset.

$$e(t) = \begin{cases} \Delta & \text{if } fst \leq t \leq fet \\ 0 & \text{otherwise} \end{cases}$$

and fst=fet. The parameter $\Delta$ is the spike magnitude.

3. Shock: A constant offset is sustained over a long period. For example, a sensor is knocked out of line and then reset.

$$e(t) = \begin{cases} \Delta & \text{if } fst \leq t \leq fet \\ 0 & \text{otherwise} \end{cases}$$

and fst<fet. The parameter $\Delta$ is the observation bias due to the shock.

4. Echo: Two observations are received, one is the true observation and another is the target image formed by the signal reflecting from a wall say. The distance between the observations remains constant. The echo is modelled by conflating the observations into a single value, $z=0.5(z_1+z_2)$. Thus:

$$e(t) = \begin{cases} \Delta & \text{if } fst \leq t \leq fet \\ 0 & \text{otherwise} \end{cases}$$

the parameter $\Delta$ now describes the offset of z from the truth. Note, an echo is distinguishable from a shock as two observation streams are observed for an echo and only one for a shock.

In each case $\Delta=0$ describes a fault free sensor.

Each fault can have a fault start time (fst) and fault end time (fet) that bound a period over which the fault occurs.

A Bayesian approach is used in the example to remove the faults. The current fault characteristics (if a fault has occurred) are learnt online and then the fault can be removed once its effect is known. Since there will always be some uncertainty as to the nature of the fault, integration over the fault probabilities is performed and a single estimate is generated which captures the uncertainties in the fault.

Each sensor is dealt with individually and, for ease of representation, the sensor index is omitted herein. Let $x_t$ denote the target's state at time t, $z^t_1$ denote the sensor's observations up to time t and let $z_t$ denote the sensor's observation at time t. Let $\theta=\{ft, fst, fet, \Delta\}$ denote the failure hypothesis (see E Y Chow and A S Willsky, "Bayesian design of decision rules for failure detection", *IEEE Transactions on Aerospace and Electronic Systems*, vol. 20, no. 6, pp. 309-320, 1988) with parameters which are, respectively, the fault type, fault start and end times and the magnitude of the fault. The aim of the system is not only to identify which type of fault has occurred, but also when it occurred. It is also desirable to remove the fault from the data so that the sensor can supply an accurate estimate of the target's location. The target state given (possibly) faulty observations $z^t_1$ is distributed thus:

$$p(x_t|z_1^t) = \int d\theta\, p(x_t|z_1^t, \theta) p(\theta|z_1^t).$$

The posterior $p(x_t|z^t_1, \theta)$ is Gaussian and can be obtained from $p(x_{t-1}|z^{t-1}_1, \theta)$ using the Kalman filter. The mean and covariance for $p(x_t|z^t_1, \theta)$ are:

$$\hat{x}_\theta(t|t) = \hat{x}_\theta(t|t-1) + K_\theta[z(t) - e_\theta(t) - \hat{x}_\theta(t|t-1)]$$

$$P_\theta(t|t) = [I - K_\theta]P_\theta(t|t-1)$$

where $K_\theta$ is the Kalman gain, $K_\theta = P_\theta(t|t-1)[P_\theta(t|t-1)+W(t)]^{-1}$. Values for $\hat{x}_\theta(t|t-1)$ and $P_\theta(t|t-1)$ can be obtained in the usual way:

$$\hat{x}_\theta(t|t-1) = G(t)\hat{x}_\theta(t-1|t-1),$$

$$P_\theta(t|t-1) = G(t)P_\theta(t-1|t-1)G(t)^T + Q(t).$$

Thus:

$$\hat{x}(t|t') = \int d\theta\, p(\theta|z_1^{t'}) \hat{x}_\theta(t|t')$$

$$P(t|t') = \int d\theta\, p(\theta|z_1^{t'}) [P_\theta(t|t') + \Delta\hat{x}_\theta(t|t') \Delta\hat{x}_\theta(t|t')^T]$$

where $\Delta\hat{x}_\theta(t|t')\Delta\hat{x}_\theta(t|t')$ and $t'=t$ or $t'=t-1$, the latter corresponding to state prediction. Similarly, the parameter probability $p(\theta|z_1^t)$ can be obtained thus:

$$\begin{aligned}
p(\theta \mid z_1^t) &= \int dx_t\, p(\theta, x_t \mid z_1^t) \\
&= \int dx_t\, \frac{p(z_t \mid \theta, x_t, z_1^{t-1})}{p(z_t \mid z_1^{t-1})} p(\theta \mid z_1^{t-1}) p(x_t \mid z_1^{t-1}, \theta) \\
&= \int dx_t\, \frac{p(z_t \mid \theta, x_t)}{p(z_t \mid z_1^{t-1})} p(\theta \mid z_1^{t-1}) p(x_t \mid z_1^{t-1}, \theta) \\
&= c p(\theta \cdot \mid z_1^{t-1}) \times \mathbb{N}[z_t - e_\theta(t); \\
&\quad \hat{x}_\theta(t \mid t-1), P_\theta(t \mid t-1) + W(t)]
\end{aligned}$$

where c is a normalisation constant such that $\int d\theta\, p(\theta|z_1^t)=1$. Thus $p(\theta|\cdot)$ can be calculated recursively. The prior $p(\theta)$ should be uninformative (a flat prior is often adequate).

The Bayesian approach used in the example system can be implemented in various ways. In the example described herein it was chosen to implement this approach using a multi-hypothesis dual Kalman filter, although the skilled person will be familiar with suitable alternatives such as a Gibbs sampler implementation, which can be more sophisticated than the multi-hypothesis implementation. Each dual Kalman filter simultaneously estimates the state x and the parameter Δ given the fault type, ft and the fault start and end times, fst and fet. A multi-hypothesis KF scheme is used to incorporate uncertainty in ft, fst and fet. Each KF encodes a distinct {ft, fst, fet} triplet for discrete values for fst and fet. To obtain state estimates and state covariances, the ft, fst and fet parameters are integrated out by merging the hypotheses using standard mixture reduction (see D J Salmond, "Mixture reduction algorithms for target tracking in clutter", *Signal and Data Processing Of Small Targets*, SPIE 1305, O E Drummond, Ed, 1990, pp 343-445). Probability distributions over ft and distributions for the fst and fet can be obtained directly from $p(\theta|_{zt1})$ via marginalisation.

The output of the algorithm can be considered to comprise a report and may include the current state estimate, state covariance matrix, predictions for the current state which exclude current observations, distributions over fault start and end times and a probability for each possible fault type, although the skilled person will appreciate that items in list may be omitted or replaced by additional items.

$$R(t) = \{\hat{x}(t|t), P(t|t), \hat{x}(t|t-1), P(t|t-1),$$
$$p_{fst}(t), p_{fet}(t), p_{ft}(t)\}.$$

Figure 4:
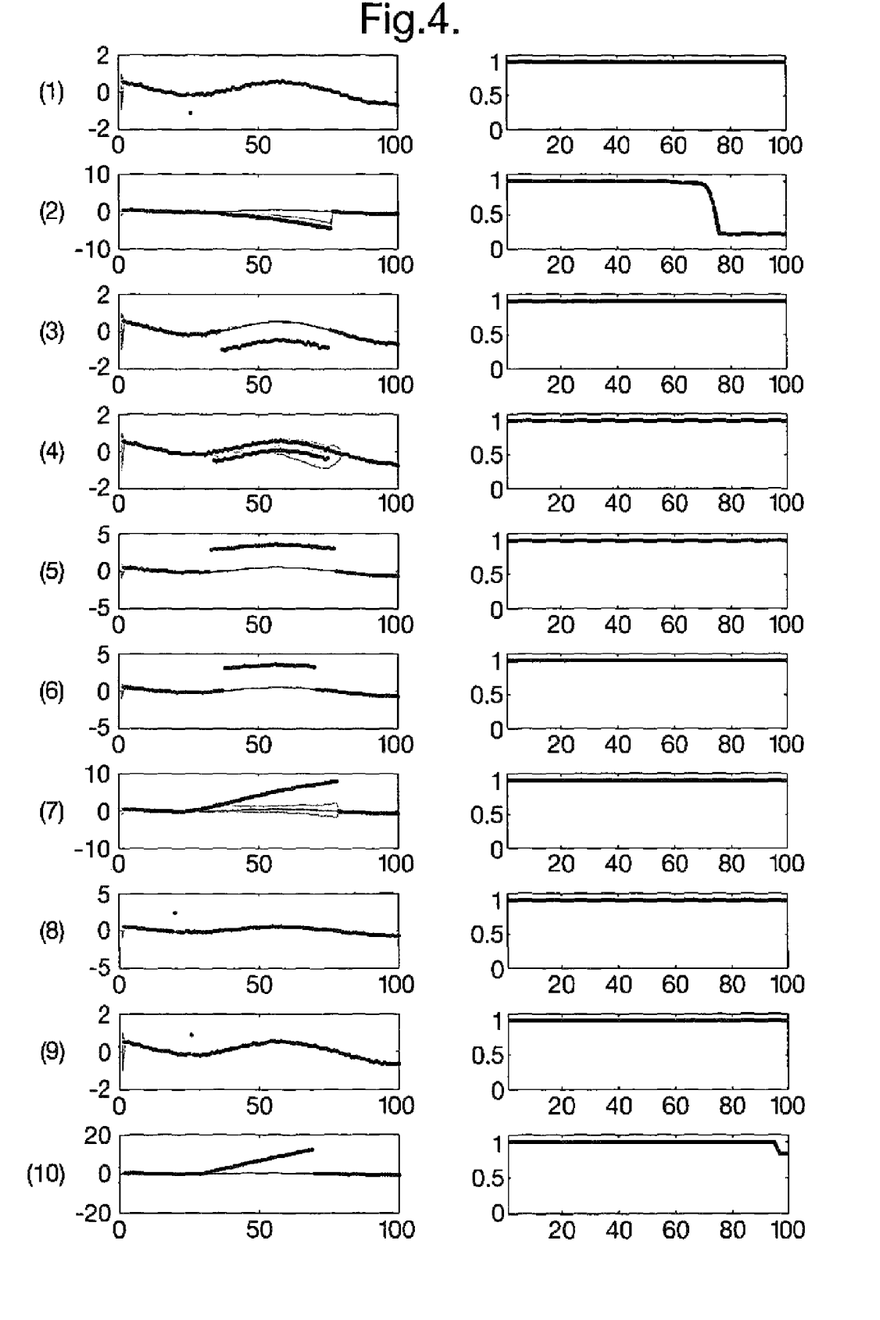
FIG. 4 illustrates graphs relating to ten sensors exhibiting various faults.

FIG. 3 shows the efficacy of the example approach on each of the fault types described above. The fault recovery algorithm is online and so does not make use of smoothing operations. It is possible to obtain an output from the first stage of the algorithm at any time, even before the fault has ended. FIG. 4 shows the actual output from the first stage at each time instant.

Redundancy can be used within the multi-sensor system to remove errors caused by un-modelled faults. The estimates from each sensor (or only some) are compared and outlier sensors are removed. Reliability is assigned to individual sensors. The advantage of considering sensors individually is clear for modular systems, where a new sensor can be added at any time, and also for computational reasons within large multi-sensor systems.

A sensor is considered "unreliable" (or untrustworthy) when its output is still inconsistent even after undergoing fault recovering during the first stage of the algorithm. The residual faults that may remain can be caused by simultaneous multiple faults within a sensor, or can arise when the target is not moving according to the Kalman filter target process model, or even when the particular fault type is not modelled. If a sensor s e S is unreliable at time t, $w_s(t)=0$. If it is reliable then $w_s(t)=1$. The "reliability" of a sensor at time t is a measure between 0 and 1 and is defined to be the probability that the sensor is reliable: $p(w_s(t)=1|\cdot)$.

It is assumed that sensors become unreliable independently of each other. This assumption is valid when, for example, individual sensors are knocked out of line. However, the assumption may fail, for example, when sensors share a common, and yet inappropriate model for the target dynamics. However, as described below, even when the failing component is shared between sensors, the sensor suite can still recover from the fault. It is assumed that at any time the number of reliable sensors exceeds the number of unreliable sensors. Consequently, the probability of simultaneous failure of all sensors is zero:

$$\prod_s p(w_s(t) = 0 \mid \cdot) = 0 \tag{2}$$

and therefore, $\max_s \{p(w_s(t)=1|\cdot)\}=1$.

$$\begin{aligned}
P_{1 \cup 2}(t \mid t') &= p(w_1(t) = 1 \mid R_1^{t'}) p(w_2(t) = 1 \mid R_1^{t'})[P_{1 \oplus 2}(t \mid t') + \\
&\quad (\hat{x}_{1 \oplus 2}(t \mid t') - \hat{x}_{1 \cup 2}(t \mid t'))(\hat{x}_{1 \oplus 2}(t \mid t') - \hat{x}_{1 \cup 2}(t \mid t'))^T] + \\
&\quad p(w_1(t) = 1 \mid R_1^{t'})[1 - p(w_2(t) = 1 \mid R_1^{t'})] \\
&\quad [P_1(t \mid t') + (\hat{x}_1(t \mid t') - \hat{x}_{1 \cup 2}(t \mid t'))(\hat{x}_1(t \mid t') - \hat{x}_{1 \cup 2}(t \mid t'))^T] + [1 - \\
&\quad p(w_1(t) = 1 \mid R_1^{t'})] p(w_2(t) = 1 \mid R_1^{t'})[P_2(t \mid t') + \\
&\quad (\hat{x}_2(t \mid t') - \hat{x}_{1 \cup 2}(t \mid t'))(\hat{x}_2(t \mid t') - \hat{x}_{1 \cup 2}(t \mid t'))^T]
\end{aligned} \tag{I}$$

A "consensus" part of the algorithm is intended to combine unreliable estimates from multiple sources. The example consensus process uses a combination of Kalman filter fusion and mixture reduction, although alternatives will be known to the skilled person. In an example where two estimates from two sensors (labelled Sensor 1 and Sensor 2) are combined, each is assigned a reliability $p(w_s(t)=1|\cdot)$. Four scenarios are possible:

1. Both sensors are reliable in which case both estimates are fused.
2. Sensor 1 is unreliable and Sensor 2 is reliable in which Sensor 2's estimate is kept and Sensor 1's estimate is discarded.
3. Sensor 1 is reliable and Sensor 2 is unreliable in which case Sensor 1's estimate is kept and Sensor 2's estimate is discarded.
4. Both sensors are unreliable in which case both estimates are discarded.

Estimates are fused using the KF or even covariance intersection [7] when the estimates are strongly correlated but their correlation is unknown. Whichever fusion algorithm is used we will denote the fused estimate $\hat{x}_{1\oplus2}$ and the fused estimate covariance as $P_{1\oplus2}$. We shall denote the estimate and covariance obtained by using the consensus algorithm as $\hat{x}_{1\uplus2}$ and $P_{1\uplus2}$, respectively. Taking the expectation over the above scenarios.

$$\hat{x}_{1\uplus2}(t|t') = p(w_1(t)=1|R_1^{t'})p(w_2(t)=1|R_1^{t'})\hat{x}_{1\oplus2}(t|t') + p(w_1(t)=1|R_1^{t'})[1-p(w_2(t)=1|R_1^{t'})]\hat{x}_1(t|t') + [1-p(w_1(t)=1|R_1^{t'})]p(w_2(t)=1|R_1^{t'})\hat{x}_2(t|t')$$

where either t'=t or t'=t−1, the latter corresponding to a prediction. Similarly for the covariance (see equation (1) at the top of this page). The reliability $p(w_{1\uplus2}=1|\cdot)$ assigned to the combined estimates is simply $p(w_{1\uplus2}=1|\cdot) = p(w_1=1|\cdot) + p(w_2=1|\cdot) - p(w_1=1|\cdot)p(w_2=1|\cdot)$.

To combine more than two estimates we can iterate over the entire set of estimates using the scheme described above. Iteration i combines estimates $\hat{x}_{i+1}(\cdot)$ with the consensus estimate $\hat{x}_{1\uplus2\uplus\ldots\uplus i}(\cdot)$, using the consensus procedure described above. Note, that the probability that the combined estimates from all the sensors is reilable is unity, $p(w_{1\uplus\ldots\uplus s}|\cdot) = 1$.

The calculation of a sensor's reliability will now be described. Let x(t|t) denote the fault recovered estimates from all sensors supplying reports up to and including time t and let $R_1^t$ denote all reports over all times 1 to t, from all sensors. It is assumed that the sensor's reliability process is Markovian and that the reports at time t depend only on the sensor's status at time t and not at previous times. The expression for the reliability, $p(w_s(t)=1|R_1^t)$, is:

$$p(w_s(t) = 1 \mid R_1^t)$$
$$= \frac{p(R(t) \mid w_s(t) = 1, R_1^{t-1})p(w_s(t) = 1 \mid R_1^{t-1})}{p(R(t))}$$
$$= p(R(t) \mid w_s(t)$$
$$= 1, R_1^{t-1}) \sum_{w_s(t-1)\in\{0,1\}} \frac{p(w_s(t) = 1 \mid w_s(t-1), R_1^{t-1})p(w_s(t-1) \mid R_1^{t-1})}{p(R(t))}$$

Since it is assumed that the sensors are independently reliable then:

$$p(R(t) \mid w_s(t) = 1, R_1^{t-1})$$
$$= \prod_{i\in S} p(R_i(t) \mid w_s(t) = 1, R_1^{t-1})$$
$$= p(R_s(t) \mid w_s(t) = 1, R_1^{t-1}) \prod_{i\neq s} p(R_i(t) \mid R_1^{t-1})$$
$$= \frac{p(R_s(t) \mid w_s(t) = 1, R_1^{t-1})}{p(R_s(t) \mid R_1^{t-1})} \prod_{i\in S} p(R_i(t) \mid R_1^{t-1})$$
$$= \frac{p(R_s(t) \mid w_s(t) = 1, R_1^{t-1})}{p(R_s(t) \mid R_1^{t-1})} p(R(t) \mid R_1^{t-1})$$

where $R_s(t)$ is the report from sensor s at time t. A value for $$\frac{p(R(t))}{p(R(t) \mid R_1^{t-1})}$$

can be calculated using mas$\{p(w_s(t)=1|\cdot)\} = 1$ from (2).

Thus, we can recursively calculate the reliabilty $p(w_s(t)=1|\cdot)$ of each sensor given a model of how its reliability varies over time, $p(w_s(t)=1|w_s(t-1), R_1^{t-1})$, and a model of the sensor's likelihood given estimate reports from the multi-sensor suite $$L_s[R_1^t] \triangleq \frac{p(R_s(t) \mid w_s(t) = 1, R_1^{t-1})}{p(R_s(t) \mid R_1^{t-1})}.$$

A sensor's reliability is assumed not to change unless there is evidence to indicate otherwise. Thus, the transition model is:

$$p(w_s(t)=1|w_s(t-1)=1, R_1^{t-1})=1,$$
$$p(w_s(t)=1|w_s(t-1)=0, R_1^{t-1})=0.$$

The form of $L_s$ can be freely chosen, subject to the constraint that a greater likelihood is assigned to the sensor failing the further its estimate is away from the truth. Thus, $L_s[R_1^t]$ must be a monotonically decreasing function of the distance between the sensor's estimate $\hat{x}_s(t|\cdot)$ and the target's state. An approximate for the target's state is the consensus estimate $\bar{x}^-$ obtained from the sensor suite $\{\hat{x}_s(t|t-1)\}$. The consensus estimate is formed by combining predictions for the current target state from the sensor reports $R_1^{t-1}$ using the procedure described above If $\bar{x}^-$ and P are the predicted consensus estimate and its covariance then:

$$\bar{x}(t) = \hat{x}_1 \uplus_2 \uplus \ldots \uplus_s(t|t-1),$$
$$P(t) = P_1 \uplus_2 \uplus \ldots \uplus_s(t|t-1).$$

$L_s$ is based on the uniformly best constant power test (see A. Wald, "Tests of statistical hypotheses concerning several parameters when the number of observations is large", *Transactions of the American Mathematical Society*, vol. 54, pp. 426-482, 1943). A sensor is deemed to be faulty if the Mahalanobis distance between its output and its predicted output is greater than a threshold value $\beta$. In the example this rule is softened so that outliers do not immediately lead to a sensor being designated unreliable.

$$L_s[R_1^t] = \begin{cases} c & \text{if } M_s \leq \beta, \\ c\exp(-(M_s - \beta)^2) & \text{otherwise.} \end{cases}$$

where $$M_s^2 = (\hat{x}_s(t \mid t) - \bar{x}(t))^T [P_s(t \mid t) + P(t)]^{-1} (\hat{x}_s(t \mid t) - \bar{x}(t)).$$

The constant c does not contribute to the posterior reliability distribution as it vanishes after normalisation. The $\beta$ parameter is chosen according to the problem. For a 1D track $\beta=3$ is considered a sensible value since with this choice of $\beta$ a report only counts towards a sensor being unreliable if its estimate is more than three standard deviations from the consensus estimate.

The prior reliability $p(w_s=1)$ can be freely chosen for each sensor, provided that at least one sensor is initially trustworthy (i.e. $p(w_s=1)=1$ for some sensor s). This sensor may not remain reliable but, in this case, another sensor must be either totally reliable or become reliable.

The end-to-end efficacy of the stage algorithm on a simple single target, 1D tracking problem for which the target is initially tracked by 10 sensors is now given as an example. These sensors are subject to various faults discussed above. The target process model is the near constant acceleration model (NCAM). However, the impact of this assumption on the accuracy of the filter can be investigated by simulating targets which do not move exactly according to an NCAM, but still follow a smooth trajectory. With this mismatch between the process model and reality, we find that the fault recovery algorithm sometimes fails when sensors are subject to drift. The NCAM acceleration noise covariance is learned and the acceleration model parameter is represented within θ.

Figure 5:
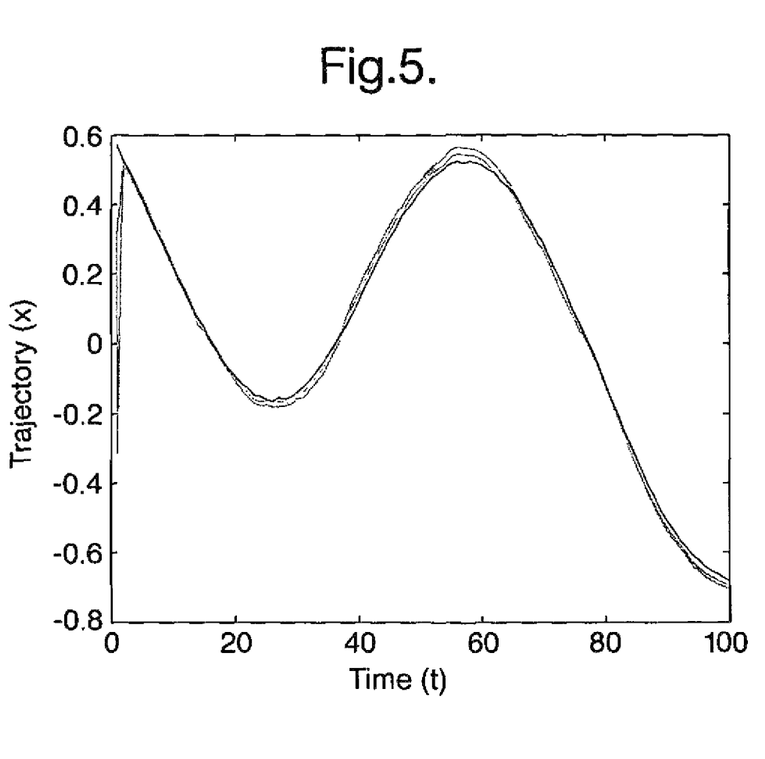
FIG. 5 is a graph showing the result of combining the outputs from the sensors of FIG. 4 using part of the example system.

FIG. 4 illustrates using graphs ten sensors exhibiting various faults. The graphs on the left show that faulty data (dotted line), truth (solid line) and the fault recovered estimate first standard deviation confidence intervals (grey region). The graphs on the right of the Figure show the trustworthiness of the sensors. The fault recovered estimates are also shown, along with the reliability $p(w_s=1|\cdot)$ over time for each sensor. Sensor 2 is a drifting sensor and has failed to correct its fault. However, the second stage of the algorithm identifies this failing sensor and decreases its trustworthiness accordingly. The graphs of FIG. 5 show the result of combining the outputs from the sensors of FIG. 4 using the second stage of the algorithm.

Figure 6:
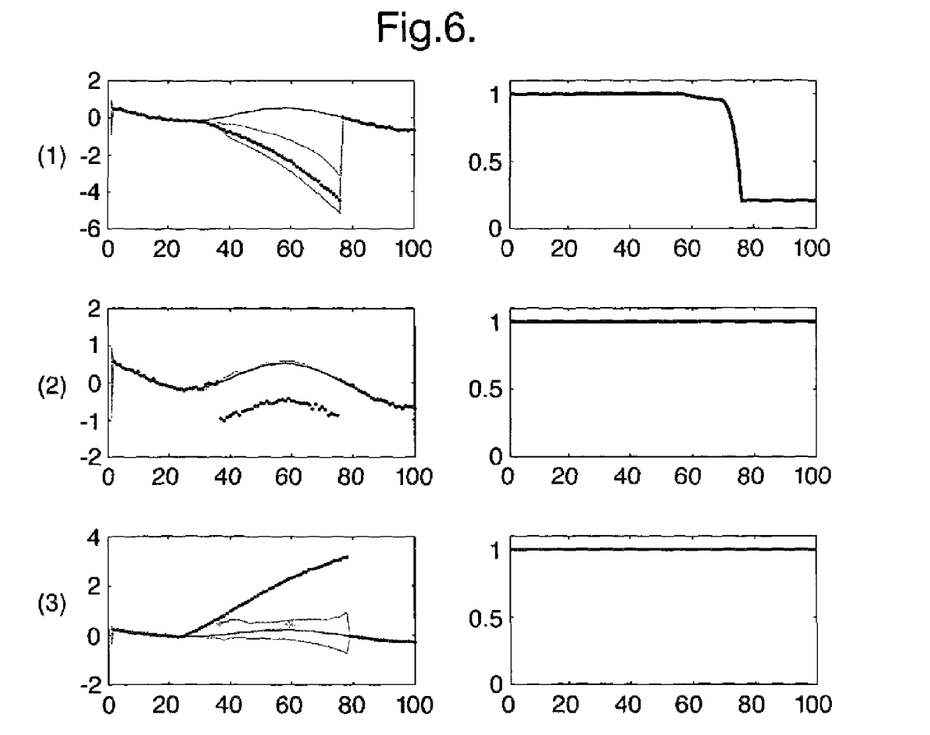
FIG. 6 illustrates graphs relating to three sensors exhibiting various faults.
Figure 7:
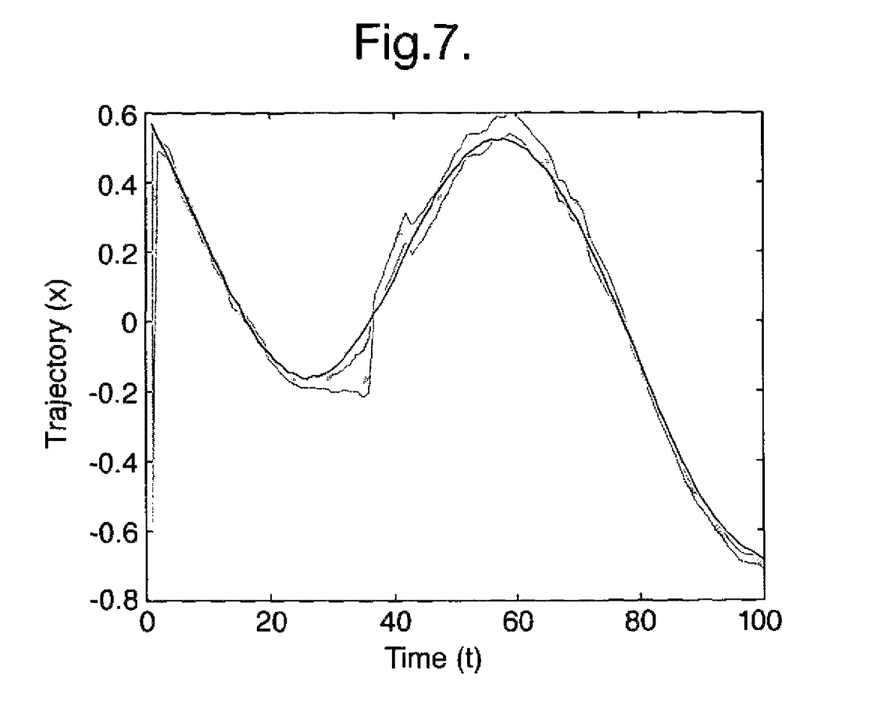
FIG. 7 is a graph showing the result of combining the outputs from the sensors of FIG. 6 using part of the example system.

In FIGS. 6 and 7 the above scenario is repeated but with a reduced set of sensors, namely sensors 2, 3 and 7 of FIG. 4. In FIG. 6 the left-hand graph shows that faulty data (dotted line), truth (solid line) and the fault recovered estimate first standard deviation confidence intervals (grey region); the right-hand graphs shows the trustworthiness of the sensors. In this experiment it is these sensors alone that are used to determine the reliability shown in FIG. 5 and ultimately the combined estimates in FIG. 7. Again, it can be seen that the second stage of the algorithm is able to correct for the deficiencies of the first stage.

Figure 8:
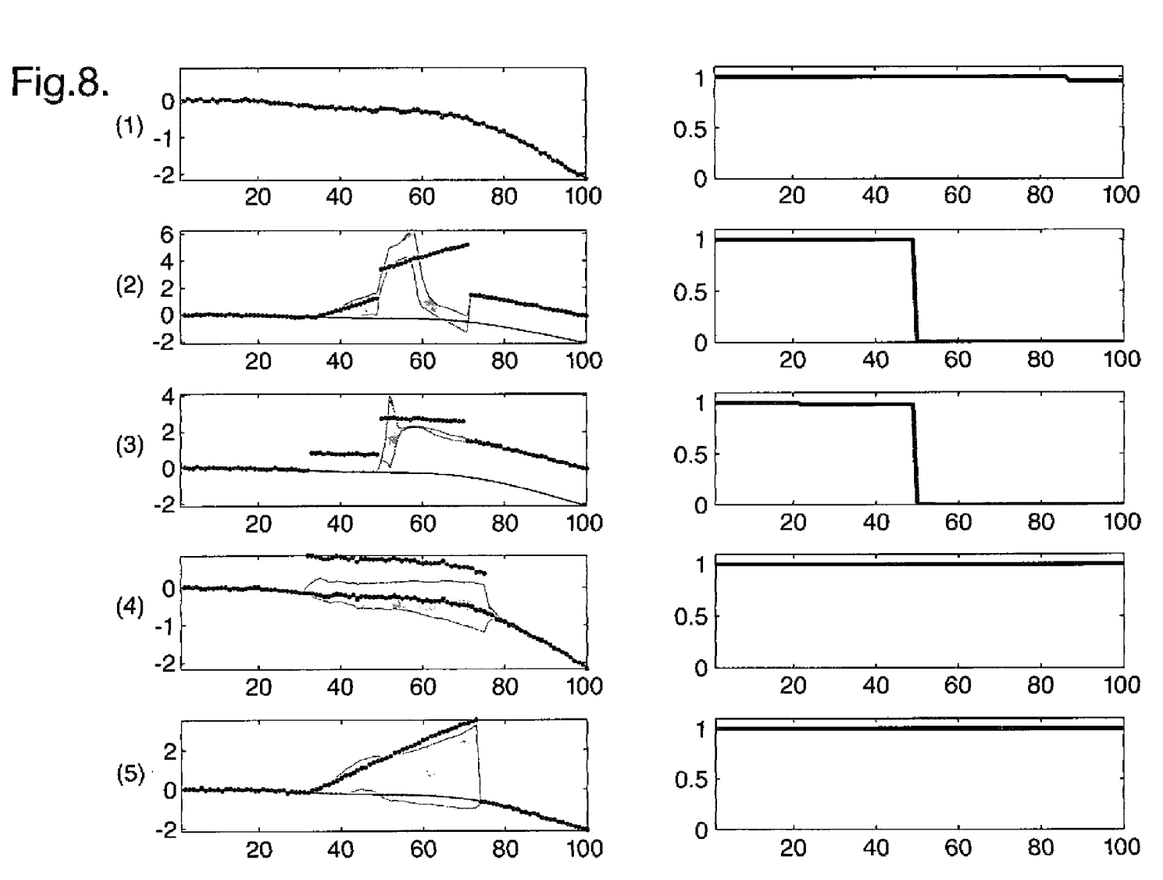
FIG. 8 illustrates graphs relating to five sensors that exhibit various faults.
Figure 9:
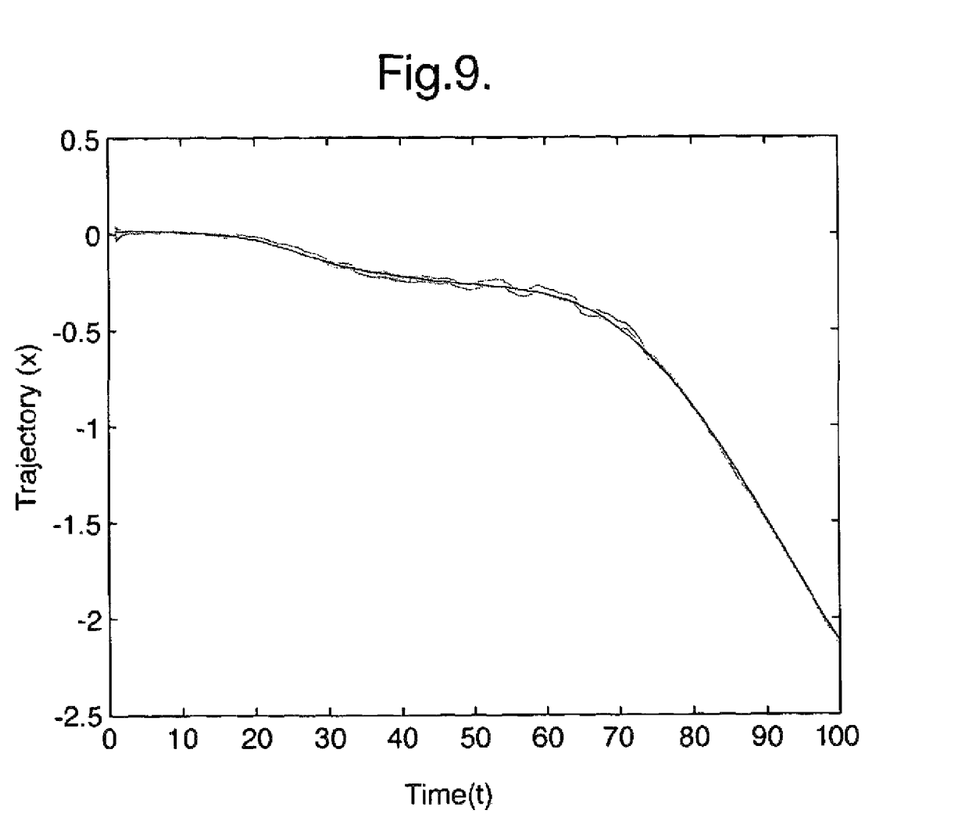
FIG. 9 is a graph showing the result of combining the outputs from the sensors of FIG. 8 using the system.

The graphs of FIGS. 8 and 9 show results for a different failure recovery scenario. FIG. 8 relates to five sensors that exhibit various faults. The left-hand graphs shows that faulty data (dotted line), truth (solid line) and the fault recovered estimate first standard deviation confidence intervals (grey region). The right-hand graphs show the trustworthiness of the sensors. FIG. 9 shows the result of combining the outputs from the sensors in FIG. 8, using the algorithm described above.

In this case, the sensor process models accurately describe the target trajectory. However, part-way through monitoring the target, sensors 2 and 3 are knocked and as a result their observations incur a constant offset bias on top of any modelled fault that they are experiencing. The first stage of the algorithm fails to correct the bias induced by the unanticipated sensor knocks; however, the second stage successfully detects the inconsistent output of these sensors and reduces their trustworthiness accordingly. The fused estimate is shown in FIG. 9.

The statistical characteristics of the algorithm can be examined in order to investigate the relative contributions that each stage makes to the fault recovery process. Four instances of the algorithm are now examined:
1. Neither fault recovery stages are employed. The fault sensor estimates are simply fused together.
2. Only the first stage of the fault recovery process is used. The outputs from each sensor, which have been processed by the first stage algorithm, are fused together.
3. Only the second stage of the fault recovery algorithm is used. Sensor estimates are assumed by each sensor to be fault free and are passed directly to the second stage without attempting to remove any faults from the estimate.
4. An end-to-end algorithm uses both stages to remove faults and unreliable sensors.

The example examination was carried out for a system comprising five sensors. Two randomly chosen sensors undergo an un-modelled and unanticipated knock at t=50. The knock is simulated by adding a fixed value to the sensor's observations. This offset persists to the end of each run unlike the modelled faults which have all ended by t=80. The modelled fault types and their parameters are chosen randomly.

The fault start times are restrained to lie within the interval [20, 40] and the fault end times are constrained to lie within the interval [70, 80] except for the spoke fault that lasts for only one time step. Constraining the start and end times this way gives three distinct temporal regions in which we can compare our algorithms. Within the first region, up until time 20, no fault has occurred. Sensors, which have been fault corrected using the first stage of the algorithm, are reliable until t=50 when two randomly chosen sensors are subject to a knock and become misaligned. This misalignment persisted until the end of each run.

500 runs were gathered and the normalised standard error (NSE) over time was calculated:

$$S(t)=E[(x(t)-x(t))^T P^{-1}(t)(x(t)-x(t))].$$

For an estimator to be consistence the normalised standard error should be no greater than the cardinality of the state vector (i.e. 1 in this case). Ideally, the value of S should be close to the cardinality of the state vector indicating that the estimate covariance is not too conservative. The accuracy of the filter was also determined and this is obtained from the RMS error:

$$R(t)=\sqrt{E[(\hat{x}(t)-x(t))^T(\hat{x}(t)-x(t))]}.$$

Ideally, the RMS error is small indicating that the estimate is close to the truth. The results for these experiments are shown in FIGS. 10 and 11, where FIG. 10 shows the result of Monte-Carlo Simulation showing the normalised standard error for the four fault recovery algorithms and FIG. 11 shows the result of Monte-Carlo Simulation showing the RMS error for the four fault recovery algorithms.

Figure 10:
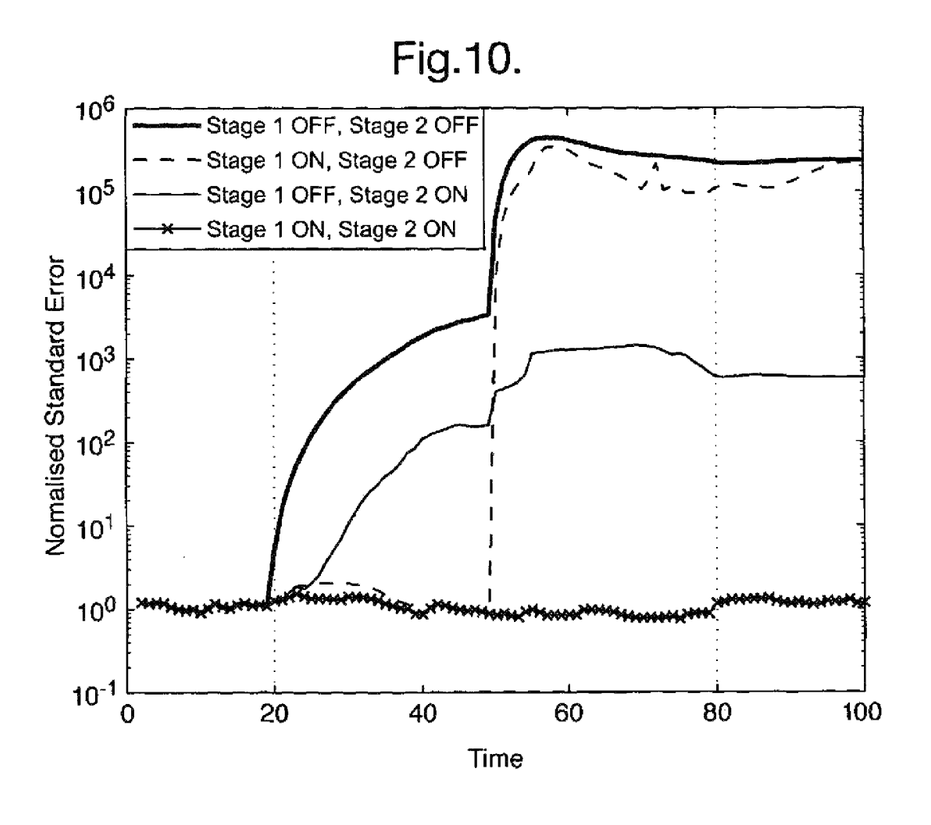
FIG. 10 is a graph illustrating the result of a Monte-Carlo Simulation, showing the normalised standard error for an experiment involving the sensor system.
Figure 11:
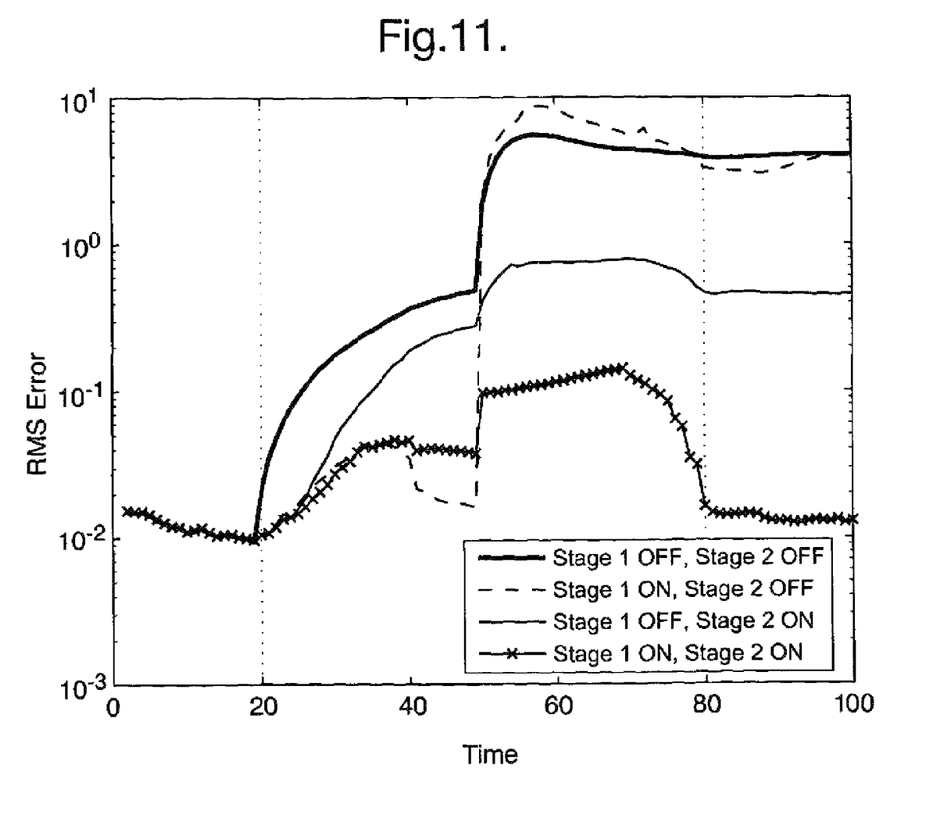
FIG. 11 is a graph illustrating the result of a Monte-Carlo Simulation showing the RMS error for the experiment.

FIG. 10 demonstrates that up until t=20, when the faults set in, the algorithms have similar NSE and RMS errors. Any differences are caused by the second stage reducing the reliability of the sensors marginally. After t=20, when the modelled faults set in, the algorithms which use the first stage remain consistent and the others diverge rapidly. The RMS value, especially in the range [20, 50] is sensitive to the threshold value, β, for those algorithms which use the second stage. As β decreases the RMS value increases. The reason for this is that the second stage of the algorithm is operating throughout the run. Fault recovered sensor estimates which are very informative with values very close to the truth can be discounted by the second stage of the algorithm when they happen to be statistical outliers. This happens especially when offset faults have occurred. Algorithms that do not use the second stage would simply fuse these estimates leading to a smaller RMS error. If it were desired to guarantee a consistent estimate throughout the run, however, then it is necessary to deploy both stages of the algorithm. After t=50 the algorithm which uses both stages is the only one which remains consistent.

The invention claimed is:

1. A method of estimating a state of at least one target using a plurality of sensors, the method comprising:
   (1) receiving a plurality of target observations from a respective plurality of sensors;
   (2) using the target observations to compute target state estimates;
   (3) assessing whether each of the target state estimates suffers from one of a set of modelled fault types;
   (4) adjusting a target state estimate to compensate for a modelled fault type if that target state estimate is assessed to suffer from that modelled fault type;
   (5) computing a reliability value for each of the target state estimates; and
   (6) fusing the target state estimates based on the computed reliability values to produce a fused target state estimate.

2. A method according to claim 1, wherein the steps (1), (2) and/or (3) comprise:
   a multi-hypothesis dual Kalman filter process.

3. A method according to claim 1, comprising:
   estimating a time period during which each of the target state estimates suffered from the modelled fault type.

4. A method according to claim 1, comprising:
   calculating a failure hypothesis associated with each of the target state estimates, wherein the failure hypothesis includes a state covariance matrix, predictions for the target state estimate that exclude at least some of the target observations, and a probability value associated with the target state estimate suffering from the modelled fault type.

5. A method according to claim 1, wherein the computing of a reliability value for each of the target state estimates is performed for the target observation received from each sensor individually.

6. A method according to claim 5, wherein the computing of the reliability of the target state estimates comprises:
   computing a distance between the target state estimate as computed using the target observation from a first one of the sensors and a target state estimate as computed using the target observation(s) from at least one other of the sensors.

7. A method according to claim 6, wherein a target state estimate is computed as being unreliable if the distance exceeds a predefined threshold value.

8. A method according to claim 7, wherein the fusing of the target state estimates comprises:
   fusing the target state estimates only if the target state estimates are computed as being reliable.

9. A method according to claim 1, wherein the fusion comprises:
   Kalman filtering or even covariance intersection, and mixture reduction processes.

10. A computer program product configured as a non-transitory computer readable medium having thereon computer program code which, when the program code is loaded into a computer, will cause, the computer to execute a method of estimating a state of at least one target using a plurality of sensors according to claim 1.

11. A system configured to estimate a state of at least one target using a plurality of sensors, the system comprising:
    a plurality of sensors configured to receive target observations;
    a device configured to receive a plurality of target observations from the plurality of sensors;
    a device configured to compute target state estimates from the target observations;
    a device configured to assess whether each of the target state estimates suffers from one of a set of modelled fault types;
    a device configured to adjust the target state estimates to compensate for a modelled fault type if that target state estimate is assessed to suffer from that modelled fault type;
    a device configured to compute a reliability value for each of the target state estimates; and
    a device configured to fuse the target state estimates based on the computed reliability values to produce a fused target state estimate.

12. A system according to claim 11, wherein the sensors are configured to transfer their observations to a remote device that comprises:
    the device configured to compute target state estimates;
    the device configured to assess whether each of the target state estimates suffers from one of a set of modelled fault types; and
    the device configured to adjust the target state estimates to compensate for a modelled fault type if that target state estimate is assessed to suffer from that modelled fault type.

13. A system according to claim 11, wherein each of the sensors comprises:
    the device configured to compute target state estimates;
    the device configured to assess whether each of the target state estimates suffers from one of a set of modelled fault types; and
    the device configured to adjust the target state estimates to compensate for a modelled fault type if that target state estimate is assessed to suffer from that modelled fault type.

* * * * *